United States Patent [19]

Werner, Jr. et al.

[11] Patent Number: 5,204,404
[45] Date of Patent: Apr. 20, 1993

[54] WATERBASED ACRYLIC SILANE AND POLYURETHANE CONTAINING COATING COMPOSITION

[75] Inventors: Ervin R. Werner, Jr., Levittown, Pa.; Eileen E. Konsza, Swedesboro, N.J.

[73] Assignee: E. I. Du Pont de Nemours and Company, Wilmington, Del.

[21] Appl. No.: 568,488

[22] Filed: Aug. 16, 1990

Related U.S. Application Data

[63] Continuation-in-part of Ser. No. 326,724, Mar. 21, 1989, abandoned.

[51] Int. Cl.$^5$ .............................................. C08K 3/20
[52] U.S. Cl. ..................................... 524/501; 524/507; 524/806
[58] Field of Search ........................ 524/507, 501, 806

[56] References Cited

U.S. PATENT DOCUMENTS

| | | | |
|---|---|---|---|
| 3,551,391 | 12/1970 | Crocker et al. | 240/78.5 |
| 3,561,996 | 2/1971 | Young | 117/62.1 |
| 3,729,438 | 4/1973 | Plesich et al. | 260/29.6 |
| 3,814,716 | 6/1974 | Kowalski et al. | 240/29.6 |
| 3,935,155 | 1/1976 | Osmond et al. | 260/34.2 |
| 3,951,893 | 4/1976 | Gander | 240/23 |
| 3,997,485 | 12/1976 | Dowbenko et al. | 240/22 |
| 4,035,540 | 7/1977 | Gander | 428/198 |
| 4,043,953 | 8/1977 | Chang et al. | 240/18 |
| 4,045,602 | 8/1977 | Sommer et al. | 427/386 |
| 4,062,451 | 12/1977 | Gander | 206/524.2 |
| 4,093,673 | 6/1978 | Chang et al. | 240/824 |
| 4,133,938 | 1/1979 | Bingham | 428/440 |
| 4,147,685 | 4/1979 | Smith, Jr. | 240/31.2 |
| 4,147,688 | 4/1979 | Makhlouf et al. | 240/33.6 |
| 4,181,687 | 1/1980 | Ward et al. | 525/100 |
| 4,191,713 | 3/1980 | Yonezawa et al. | 525/102 |
| 4,291,136 | 9/1981 | Keogh | 525/102 |
| 4,310,640 | 1/1982 | Kato et al. | 525/100 |
| 4,356,233 | 10/1982 | Lange et al. | 428/336 |
| 4,368,297 | 1/1983 | Kato et al. | 525/342 |
| 4,371,664 | 2/1983 | Kato et al. | 525/100 |
| 4,384,013 | 5/1983 | Noren | 427/255.4 |
| 4,395,463 | 7/1983 | Kray | 428/440 |
| 4,399,261 | 8/1983 | Kato et al. | 525/342 |
| 4,435,536 | 3/1984 | Kato et al. | 524/398 |
| 4,451,602 | 5/1984 | Furukawa et al. | 524/266 |
| 4,489,135 | 12/1984 | Drexler et al. | 428/423.1 |
| 4,491,508 | 1/1985 | Olson et al. | 204/159.13 |
| 4,491,650 | 1/1985 | Rizk et al. | 525/102 |
| 4,499,150 | 2/1985 | Dowbenko et al. | 428/440 |
| 4,499,151 | 2/1985 | Dowbenko et al. | 428/440 |
| 4,518,726 | 5/1985 | Kato et al. | 524/32 |
| 4,543,403 | 9/1985 | Isayama et al. | 526/263 |
| 4,567,107 | 6/1986 | Rizk et al. | 428/425.5 |
| 4,575,535 | 3/1986 | Keogh | 525/106 |
| 4,578,417 | 3/1984 | Furukama et al. | 524/378 |
| 4,587,290 | 5/1986 | Davies et al. | 524/558 |
| 4,603,064 | 7/1984 | Kania | 427/407.1 |
| 4,611,040 | 9/1986 | Olson et al. | 526/279 |
| 4,614,777 | 9/1986 | Kania | 526/279 |
| 4,652,610 | 3/1987 | Dowbenko et al. | 525/100 |
| 4,684,697 | 8/1987 | Chang et al. | 525/100 |
| 4,689,369 | 8/1987 | Ishino et al. | 525/288 |

FOREIGN PATENT DOCUMENTS

| | | |
|---|---|---|
| 0173278 | of 1986 | European Pat. Off. . |
| 3630793 | of 1985 | Fed. Rep. of Germany . |
| 58038766 | of 0000 | Japan . |
| 57-012058 | of 1982 | Japan . |
| 57-179261 | of 1982 | Japan . |
| 58-038766A | of 1983 | Japan . |
| 60-168769 | of 1985 | Japan . |
| 60-221450 | of 1985 | Japan . |
| 62-292820 | of 1987 | Japan . |
| 62-295969 | of 1987 | Japan . |

Primary Examiner—John C. Bleutge
Assistant Examiner—Mark D. Sweet
Attorney, Agent, or Firm—Hilmar L. Fricke

[57] ABSTRACT

A waterbased coating composition containing about 10–30% by weight of film forming binder dispersed in an aqueous carrier; wherein the binder contains a. an acrylic silane polymer of polymerized monomers of alkyl methacrylate, alkyl acrylate or mixtures thereof, a silane containing alkyl acrylate or methacrylate and the polymer has an acid no. of 2–100 and a hydroxyl no. of up to 100, a glass transition temperature of −40° to 25° C. and a weight average molecular weight of 500,000 to 3,000,000; and b. a polyurethane selected from the following group: polyester urethane, polyether urethane or polyacrylourethane;

the composition is useful for painting and refinishing the exterior of automobiles and trucks.

21 Claims, No Drawings

WATERBASED ACRYLIC SILANE AND POLYURETHANE CONTAINING COATING COMPOSITION

CROSS-REFERENCE TO RELATED APPLICATION

This application is a continuation-in-part of Ser. No. 07/326,724 filed Mar. 21, 1989, now abandoned.

BACKGROUND OF THE INVENTION

This invention is directed to a waterbased coating composition and in particular to a waterbased coating containing an acrylic silane polymer and a polyurethane.

Waterbased dispersions of polyurethane are known as shown in Drexler et al U.S. Pat. No. 4,489,135, issued Dec. 18, 1984. Aqueous dispersions of acrylic silane polymer are known as shown, for example, in Noren U.S. Pat. No. 4,384,013, issued May 17, 1983. Processes for preparing aqueous dispersions of acrylic polyesters are shown in Osborn et al U.S. Pat. No. 3,925,295 issued Dec. 9, 1975 and Osmond et al U.S. Pat. No. 3,935,155 issued Jan. 27, 1976. However, none of the compositions shown in the art form finishes that are required in particular for finishing or repair of exterior finishes of automobiles and trucks.

To date, solvent based finishes have been used to repair and refinish the exterior of automobiles and trucks. Finishes of these solvent based compositions provided the required color match, cured at ambient temperatures, had excellent adhesion to the substrate and gave properties such as gloss, hardness, distinctness of image required for the exterior of automobiles and trucks. To reduce solvent emissions, waterbased paints were suggested for use. None of the known water based paints form finishes that have the necessary properties for automotive and truck use.

Waterbased color coat for color coat/clear coat finish, i.e., a finish having a pigmented colored layer and a top clear layer, for automobiles and trucks now is coming into use for the manufacturing of original equipment. To repair such a finish, it would be very desirable and usually necessary to use a waterbased finish to match the original color particularly when metallic flake pigments are present in the color coat.

SUMMARY OF THE INVENTION

A waterbased coating composition containing about 10–30% by weight of film forming binder dispersed in an aqueous carrier and has a pH of about 7–10; wherein the binder is a blend of a dispersed acrylic silane polymer and a dispersed polyurethane and contains about
  a. 60–90% by weight, based on the weight of the binder, of an acrylic silane polymer of polymerized monomers of alkyl methacrylate, alkyl acrylate or mixtures thereof, 1–10% by weight, based on the weight of the acrylic silane polymer, of silane containing alkyl acrylate or methacrylate and sufficient monoethylenically unsaturated acid to provide the polymer with an acid number of 2–100 and sufficient hydroxy alkyl acrylate or hydroxy alkyl methacrylate to provide the polymer with a hydroxyl number up to about 100, and the polymer has a glass transition temperature of $-40°$ to $+25°$ C. and and a weight average molecular weight of 500,000 to 3,000,000, and the acid groups of the polymer are reacted with ammonia or amine; and
  b. 10–40% by weight, based on the weight of the binder, of a polyurethane selected from the following group: polyester urethane, polyether urethane or polyacrylourethane.

The composition forms an automotive quality clear coat and/or pigmented color coat and can be used as primer composition. Articles coated with a clear coat which may or may not be the composition of this invention and a pigmented color coat of the coating composition of this invention and a process for forming the coated articles are also part of this invention.

DETAILED DESCRIPTION OF THE INVENTION

The coating composition of the invention is stable for extended periods of time, has a very low VOC content (volatile organic content), can be pigmented with all existing commercial pigments used for automobiles and trucks, forms finishes that are hard, glossy, weatherable and durable. In particular, the composition has excellent adhesion to a variety of substrates such as previously painted substrates, cold rolled steel, phosphatized steel, steel coated with conventional primers such as electrodeposition primers that typically are crosslinked epoxy polyesters and various epoxy resin, alkyd resin repair primers, plastic substrates such as polyester reinforced fiber glass, reaction injection molded urethanes and partially crystalline polyamides. A clear coat can be applied to a layer of the pigmented composition to provide a clear/color coat finish. The coating composition used for the clear coat can be the coating composition of this invention or another compatible aqueous or solvent based coating composition.

The coating composition can also be used as a primer over cold rolled steel, treated steel such as phosphatized steel or the aforementioned plastic substrates. The primer provides a surface to which a topcoat will adhere such as a topcoat of the coating composition of this invention as described above.

The coating composition has a film forming binder content of about 10–30% by weight and correspondingly, about 90–70% by weight of an aqueous carrier which is primarily water but often contains small amounts of organic solvents for the binder. The composition may be used as a clear coating composition which may contain very small amounts of pigment to eliminate color such as yellowing. Generally, the composition is pigmented and contains pigments in a pigment to binder weight ratio of about 1:100–200:100.

The film forming binder of the composition contains about 60–90% by weight of an acrylic silane polymer and correspondingly about 10–40% by weight of a polyurethane. Preferably, the binder contains about 65–85% by weight of the acrylic silane polymer and 35–15% by weight of the polyurethane. Preferably, for solid color compositions, i.e. compositions in which metallic pigments such as aluminum flake are not used, the binder preferably contains about 70% acrylic silane polymer and 30% polyurethane and for metallic colors, i.e. compositions containing aluminum flake, the binder contains about 80% acrylic silane polymer and 20% polyurethane.

The acrylic silane polymer is formed by conventional emulsion polymerization by emulsifying a mixture of monomers, water, surfactant and polymerization catalyst and charging the resulting emulsion into a conventional polymerization reactor and heating the constituents in the reactor to about 60°-95° C. for about 15 minutes to 8 hours and then the resulting polymer is neutralized with ammonia or an amine. The size of the polymeric particles of the latex is about 0.6-0.20 microns. The resulting polymer has an acid no. of 2-100, a hydroxyl no. of up to about 100, a glass transition temperature of −40° to +25° C. and a weight average molecular weight of about 500,000–3,000,000.

For solid color compositions an acrylic silane polymer can be used that does not contain hydroxyl groups but for metallic color compositions, the acrylic silane polymer must contain hydroxyl groups and should have a hydroxyl no. of about 5-100. Hydroxyl groups are needed to obtains a finish with a high quality metallic appearance.

All molecular weights herein are measured by gel permeation chromatography using polymethyl methacrylate as the standard.

Typically useful catalysts are ammonium persulfate, hydrogen peroxide, sodium meta bisulfite, hydrogen peroxide sodium sulfoxylate and the like.

Typically useful surfactants are nonylphenoxypolyethyleneoxy ethanol sulfate, allyl dodecyl sulfosuccinate, alkyl phenoxy polyethylene oxyethanol, sodium lauryl sulfate and mixtures thereof. One preferred surfactant is a mixture of nonylphenoxy polyethyleneoxy ethanol sulfate and allyl dodecyl sulfosuccinate.

The acrylic silane polymer contains about 1-10% by weight of polymerized silane containing acrylate or methacrylate. Typically useful silane containing acrylates or methacrylates have the following structural formula:

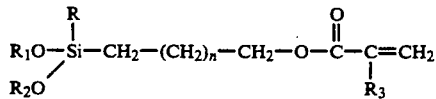

wherein:
R is either $CH_3$, $CH_3CH_2$, $CH_3O$, or $CH_3CH_2O$;
$R_1$ and $R_2$ are $CH_3$ or $CH_3CH_2$; and
$R_3$ is either H, $CH_3$, or $CH_3CH_2$ and n is 0 or a positive integer of not greater than 8.

Preferred silanes are gamma trimethoxysilylpropyl methacrylate and gamma trimethoxysilylpropyl acrylate.

The acrylic silane polymer preferably contains sufficient polymerized hydroxy alkyl methacrylate or acrylate having 2-4 carbon atoms in the alkyl group to provide the polymer with a hydroxyl no. of 5-100. Usually, about 2-10% by weight of hydroxy alkyl acrylate or methacrylate is used. Typically useful monomers are hydroxyethyl acrylate, hydroxylpropyl methacrylate, hydroxybutyl methacrylate, hydroxyethyl methacrylate, hydroxylpropyl acrylate. Other useful polymerizable constituents are reaction products of an alkyl methacrylate or acrylate and a lactone. A constituent of this type is "Tone" 100 made by Union Carbide which is believed to be the reaction product of hydroxyethyl acrylate and a lactone.

The acrylic silane polymer also contains sufficient polymerized monoethylenically unsaturated carboxylic acid monomers to provide the polymer with an acid no. of about 2-100. Typically useful monoethylenically unsaturated acids are methacrylic acid, acrylic acid, itaconic acid, styrene sulfonic acid and salts thereof. Usually, these unsaturated acids are used in an amount of about 0.1-10% by weight, based on the weight of the polymer.

The acid is neutralized with ammonia or an amine and the pH of the resulting coating composition is adjusted to about a pH of 7-10. Typically useful amines are primary amines and secondary amines and are as follows: aminoethyl propanol, allylamine, 1-amino-2-propanol, 3-amino-1-propanol, benzylamine, butylamine, sec. butylamine, tert. butylamine, cyclohexylamine, decylamine, dodecylamine, ethanolamine, ethylamine, 2-ethylhexylamine, heptylamine, hexylamine, isobutylamine, isopropylamine, methylamine, octylamine, pentylamine, propylamine, ethylene diamine and the like. Typically useful secondary amines are 2,2-dimethyl oxaolidine-1,4, 2,2-dimethanol oxazolidine-1,4, 2-methyl 1-2-methanol oxazolidine-1,4, 2,2-diethyl oxazolidine-1,4, dibenzyl amine, dibutylamine, dioyclohexylamine, didodeoylamine, diethanolamine, diethylamine, 2,2-diethylhexylamine, dihexylamine, disopropanolamine, dimethyl amine, dioctylamine, dipentylamine, dipropylamine, 2-ethyl amino ethanol, 2(2-hydroxyethylamino)-2-(hydroxymethyl)-1,3-propanediol, 2-methyl aminoethanol, 2,(2-amino ethylamino) ethanol, 3,3 diamino-dipropylamine, diethylene triamine, N-methyl ethylene diamine and the like.

The remaining constituents of the acrylic silane polymer are polymerized alkyl acrylates and/or methacrylates preferably having about 1-12 carbon atoms in the alkyl group. These constituents are blended to provide the desired polymer glass transition temperature. Typically useful monomers are methyl methacrylate, ethyl acrylate, propyl acrylate, propyl methacrylate, butyl methacrylate, isobutyl methacrylate, butyl acrylate, isobutyl acrylate, hexyl acrylate, hexyl methacrylate, 2-ethylhexyl methacrylate, 2-ethylhexyl acrylate, lauryl methacrylate and the like. Also, up to about 20% by weight of styrene can be used to form the acrylic silane polymer.

Up to about 10% by weight, based on the weight of the acrylic silane polymer, methacrylamide or allyl methacrylate can be used.

The following are particularly useful acrylic silane polymers:

an acrylic silane polymer containing about 40-50% by weight methyl methacrylate, 40-50% by weight 2-ethylhexyl acrylate, 2-6% by weight gamma trimethoxysilylpropyl methacrylate, 2-5% by weight hydroxyethyl acrylate and 1-3% by weight methacrylic acid;

an acrylic silane polymer containing about 25-35% by weight methyl methacrylate, 10-20% by weight styrene, 40-50% by weight 2-ethylhexyl acrylate, 2-6% by weight gamma trimethoxysilylpropyl methacrylate 2-5% by weight hydroxyethyl acrylate 1-3% by weight methacrylic acid;

an acrylic silane graft copolymer of stage I of 30-40% by weight of methyl methacrylate, 10-20% by weight styrene, 40-50% by weight butyl acrylate and 1-5% by weight gamma trimethoxysilylpropyl methacrylate grafted to stage II of 25-30% by weight of methyl methacrylate, 10-15% by weight styrene, 30-40% by weight butyl acrylate, 6-10% by weight gamma trimethoxysilylpropyl methacrylate, 8-12% by weight hydroxyethyl acrylate and 5-9% by weight methacrylic acid;

a two stage acrylic silane graft copolymer of stage I of 10–30% by weight of methyl methacrylate, 70–90% by weight butyl acrylate to stage II of 70–80% by weight of butyl acrylate, 6–10% by weight gamma trimethoxysilylpropyl methacrylate, 8–12% by weight hydroxyethyl acrylate and 5–9% by weight methacrylic acid; and a three stage acrylic silane graft copolymer graft polymer, wherein stage I and stage II each comprise methyl methacrylate, allyl methacrylate, butyl acrylate, and stage III comprises methyl methacrylate, butyl acrylate and gamma trimethoxysilylpropyl methacrylate.

Typical polyurethanes that are used in the coating composition are in the form of an aqueous dispersion have a particle size of less than 0.1 microns. These polyurethanes are formed by reacting a polyester, polyether, polylactone or polyacrylic having terminal hydroxyl groups with a diisocyanate in a molar ratio such that the resulting intermediate product has terminal isocyanate groups. Then the isocyanate groups of this intermediate product are reacted with a compound which has a group that is reactive with the isocyanate groups and has at least one group that is capable of forming an anion. This group is subsequently neutralized with a tertiary amine to form a water dispersible polyurethane and the resulting polyurethane is then chain extended in water with a diamine by reaction of the diamine with unreacted isocyanate groups of the polyurethane. A process for making such polyurethanes in aqueous dispersion is disclosed in Drexler et al U.S. Pat. No. 4,489,135 issued Dec. 18, 1984 which is hereby incorporated by reference.

Typical polyester urethanes are formed by preparing a polyester polyol from a polyol and a dicarboxylic acid or an anhydride. Useful acids include succinic acid, adipic acid, suberic acid, azelaic acid, sebacic acid, phthalic acid, isophthalic acid, maleic acid and anhydrides of these acids. Useful diols include ethylene glycol, butylene glycol, neopentyl glycol, hexane diol or mixtures of any of the above. The polyester polyol is reacted with suitable diisocyanate in a molar ratio of polyol to diisocyanate of about 1:2 to form an isocyanate terminated product.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersability are trimethylamine, triethylamine, dimethylaniline, diethylaniline, triphenylamine and the like.

Diamines suitable for chain extension of the polyurethane to give N-alkylurea groups are as follows: ethylenediamine, diaminopropane, hexamethylene diamine, hydrazine, aminoethylethanolamine and the like.

Typical polylactones that can be used to form the polyurethane can be lactones such as caprolactone reacted with a diol. Other useful lactones can be represented by the formula

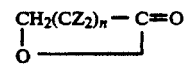

in which n is preferably 4 to 6 and Z is hydrogen, an alkyl radical, a cylcoalkyl radical or an alkoxy radical and does not contain more than 12 carbon atoms. The most preferred lactone is epsilon caprolactone since it is readily available and provides a coating with excellent properties. Typically useful aliphatic diols that can be used to form the polylactone are ethylene glycol, 1,3-propanediol, 1,4-butanediol, and dimethylolcylcohexane.

Typical polyethers that can be used to form the polyurethane are polypropylene glycols such as those designated as "Niax" polypropylene glycols 425, 2025, 3025, 4025 and the like. The numbers designate the molecular weight of the polypropylene glycols. Polypropylene glycols having a weight average molecular weight of about 400–4500 can be used.

Typical hydroxyl terminated polyacrylics that can be used to form the polyurethane are prepared by ethylenic polymerization of acrylic esters such as the aforementioned alkyl acrylate or methacrylates with ethylenic unsaturated monomers containing functional groups such as carboxyl, hydroxyl, cyano groups and/or glycidyl groups. Any of the aforementioned alkyl acrylates and methacrylates can be used. Typically useful functional monomers are acrylic acid, methacrylic acid, 2-hydroxyethyl methacrylate, 2-hydroxypropyl methacrylate, any of the other aforementioned hydroxyalkyl acrylates or methacrylates, glycidyl methacrylate or acrylate, 2-cyanoethyl acrylate or methacrylate and the like.

These polylactones, polyethers or polyacrylics are reacted as shown above for the polyester to form an aqueous polyurethane dispersion.

Typical pigments that can be used in the composition are metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones and the like.

When the coating contains metallic pigments, agents which inhibit the reaction of the pigments with water may be added. Typical inhibitors are phosphated organic materials such as "Vircopet" 40 available from Mobil Chemical Co.

The pigments can be introduced into the coating composition by first forming a mill base or pigment dispersion with either the acrylic silane polymer or the polyurethane or with another compatible polymer or dispersant by conventional techniques such as high speed mixing, sand grinding, ball milling, attritor grinding or two roll milling. The mill base is blended with other constituents used in the composition.

The coating composition can contain about 0.01–2% by weight, based on the weight of the binder, of ultraviolet light stabilizers which includes ultraviolet light absorbers, screeners and quenchers. Typical ultraviolet light stabilizers include benzophenones, triazines, triazols, benzoates, hindered amines and blends thereof.

Thickeners and rheology control agents can be added to the coating composition in amounts of about 0.5-5% by weight of the coating composition to provide the desired spray viscosity. Typically, acrylic polymers such as polyacrylic acid, clays such as "Bentones", cellulosics, or urethanes can be added.

The coating composition can be applied to a plastic or metal substrate by conventional techniques such as spraying, electrostatic spraying, dipping, brushing, flowcoating and the like. The preferred method is spraying. After application, the composition is dried at ambient temperatures but can be baked at about 50°-80° C. for about 5-45 minutes to form a coating layer about 0.1-2.0 mils thick. Generally the layer is about 0.5-1.5 mils thick. For clear coat/color coat systems a clear layer usually a solvent based composition is applied to a dry film thickness of about 1.5-2.5 mils. Aqueous based clear coating compositions also can be used.

The following example illustrates the invention. All parts and percentages are on a weight basis unless otherwise indicated. Molecular weights are determined by gel permeation chromatography using polymethyl methacrylate as the standard.

EXAMPLE 1

A coating composition is prepared by first forming an acrylic silane polymer latex and then mixing the latex with the other components used in the coating composition.

| Latex A | Parts By Weight |
|---|---|
| Portion 1 | |
| Deionized water | 1320.0 |
| Nonylphenoxypolyethyleneoxy ethanol sulfate | 10.0 |
| Portion 2 | |
| Ammonium persulfate | 4.0 |
| Deionized water | 40.0 |
| Portion 3 | |
| Methyl methacrylate monomer (MMA) | 728.0 |
| 2-Ethylhexyl acrylate monomer (2-EHA) | 728.0 |
| Gamma trimethoxysilyl propyl methacrylate (TPM) | 64.0 |
| Hydroxyethyl acrylate (HEA) | 48.0 |
| Methacrylic acid (MMA) | 32.0 |
| Nonylphenoxypolyethyleneoxy ethanol sulfate | 27.0 |
| Deionized water | 954.0 |
| Portion 4 | |
| Aqueous ammonium hydroxide solution (28% aqueous solution) | 30.0 |
| Deionized water | 30.0 |
| Total | 4015.0 |

Portion 1 was added to a reaction vessel equipped with a heating mantle, stirrer, thermometer, reflux condenser and two addition funnels. The resulting mixture was heated to 85° C. with mixing. Portion 2 was placed in a vessel attached to an addition funnel. Portion 3 was emulsified with an Eppenbach homogenizer. 5% of the resulting emulsion was added to the reaction vessel and the temperature of the constituents in the vessel was stabilized at 85° C. Portion 2 was then added and held for 5 minutes and then the remainder of the Portion 3 emulsion was added over a period of 90 min. at a uniform rate. The temperature of the resulting polymerization mixture was maintained at 88°-90° C. during the addition. The polymerization mixture was held at the above temperature for about 1 hour. The polymerization mixture was cooled to 35° C. and then Portion 4 was added to neutralize the latex.

The resulting latex polymer had the following composition: MMA/2-EHA/TPM/HEA/MAA in a weight ratio of 45.5/45.5/4/3/2. The polymer had a weight average molecular weight of about 250,000-1,250,000, a hydroxyl no. of 31, and an acid no. of 24. The latex had a polymer particle size of 0.107 microns, a gallon weight of 8.61 lbs/gal, pH of 9.2, percent weight solids of 37.4 and a percent volume solids 35.2.

Latex B was prepared using the above procedure but the following monomers were used: MMA/Styrene/2-EHA/TPM/HEA/MAA in a weight ratio of 30.5/15/45.5/4/3/2.

| Orange Basecoat Composition was prepared as follows: | |
|---|---|
| | Parts by Weight |
| A. Millbase preparation: | |
| The following ingredients were premixed and then ground in an attritor: | |
| Acrylic copolymer dispersion (50% solids aqueous dispersion of methyl methacrylate/ butyl acrylate/methacrylic acid polymer neutralized with ammonia) | 5.40 |
| Deionized Water | 19.67 |
| Opaque organic orange pigment (benzimidazolinone pigment) | 13.50 |
| Total | 38.57 |
| B. Basecoat preparation: | |
| To the millbase composition (above) the following ingredients were added in order with mixing: | |
| Latex A (prepared above) | 39.34 |
| Polyether urethane latex (Neorez R-970-ICI Resins - 39% solids of aliphatic polyether urethane having a particle size of about 0.1 microns) | 20.63 |
| Flow control agent (Potassium salt of complex organic polyphosphoric ester acid anhydride Strodex PK-90 - Dexter Chemical Co.) | 0.13 |
| Thickener (Acrylic copolymer emulsion Polyacrylic acid - Acrysol ASE-60-Rohm & Haas Co.) | 1.15 |
| Ammonium hydroxide solution (28% aqueous solution) | 0.18 |
| Total | 100.00 |

The resulting coating composition has a solids content of 40.64%, and a pigment/binder ratio of 50/100.

The orange basecoat was sprayed onto primed cold-rolled steel panels. The panels were then spray-coated with a two component acrylic urethane clear coating composition and cured at ambient temperatures for 21 days. The resulting basecoat had a dry film thickness of about 2.9-3.2 mils and the clear coat had a dry film thickness of about 2.8-3.1 mils.

The coating on the panel had the following properties:
Appearance - excellent
20° Gloss=99.2
Dry crosshatch and tap adhesion=10
Humidity resistance (96 hour at 38 deg. C/100% rel. humidity):
Crosshatch adhesion=10
Blistering=10
Rating system 0-10, 10—best, 0—worst

| Silver Basecoat Composition | Parts by Weight |
| --- | --- |
| A. Millbase preparation: | |
| The following ingredients were combined in the order indicated and mixed for 15 minutes: | |
| Ethylene glycol monobutyl ether | 5.10 |
| Inhibitor solution (phosphated organic material) | 6.10 |
| Aluminum flake paste (65% solids in Mineral spirits) | 3.74 |
| B. Basecoat preparation: | |
| To the millbase composition (above) the following ingredients were added in order with mixing: | |
| Deionized Water | 51.24 |
| Latex A (prepared above) | 27.90 |
| Polyether urethane latex (Neorez R-970-ICI Resins described above) | 7.82 |
| Thickener (described above) | 2.27 |
| Ammonium hydroxide solution (28% aqueous solution) | 0.33 |
| Total | 100.00 |

The resulting coating composition had a solids content of 17.84%, and a pigment/binder ratio of 15/100.

The silver basecoat was sprayed onto primed cold-rolled steel panels. The panels were then spray-coated with the clear coating composition described above and cured at ambient temperatures for 21 days. The resulting basecoat had a dry film thickness of about 0.8–1.0 mils and the clearcoat had a dry film thickness of about 2.7–2.9 mils.

The coating on the panels had the following properties:
Appearance - excellent
20° Gloss = 100
Dry crosshatch and tape adhesion = 10
Humidity resistance (96 hour at 38° C./100% rel. humidity):
Crosshatch adhesion = 10
Blistering = 10
Rating system—same as above.

An orange basecoat composition and a silver basecoat composition were prepared using the same constituents as above except above prepared Latex B was substituted for Latex A. Primed cold rolled steel panels were coated as above with the basecoats and then coated with a clear coating composition (described above) and dried as above. The resulting coated panels had an excellent appearance and about the same properties of gloss, adhesion, humidity resistance and blistering resistance as the panels prepared above with compositions prepared with Latex A.

EXAMPLE 2

A coating composition is prepared by first forming a two stage latex C of an acrylic silane polymer and the mixing the latex with the other components used in the coating composition.

| Latex C | Parts By Weight |
| --- | --- |
| Portion 1 | |
| Deionized water | 1250.0 |
| Nonylphenoxypolyethyleneoxy ethanol sulfate | 9.0 |
| Portion 2 | |
| Ammonium persulfate | 3.5 |
| Deionized water | 44.0 |
| Portion 3 | |
| Methyl methacrylate monomer (MMA) | 206.0 |
| Butyl acrylate monomer (BA) | 846.0 |
| Nonylphenoxypolyethyleneoxy ethanol sulfate | 15.0 |
| Deionized water | 750.0 |
| Portion 4 | |
| Ammonium sulfate | 0.9 |
| Deionized water | 13.0 |
| Portion 5 | |
| Methacrylic acid monomer (MAA) | 22.0 |
| 2-Hydroxyethyl acrylate (HEA) | 30.0 |
| Gamma trimethoxysilylpropyl methacrylate monomer (TPM) | 25.0 |
| Butyl acrylate monomer (BA) | 233.0 |
| Nonylphenoxypolyethyleneoxy ethanol sulfate | 10.0 |
| Deionized water | 272.0 |
| Total | 3729.4 |

Portion 1 was added to a reaction vessel equipped as in Example 1. The resulting mixture was heated to 85° C. with mixing. Portion 2 was placed in a vessel attached to an addition funnel. Portion 3 was emulsified with an Eppenbach homogenizer. 5% of the resulting emulsion was added to the reaction vessel and the temperature of the constituents in the vessel was stabilized at 85° C. Portion 2 was then added and held for 5 minutes and then the remainder of the Portion 3 emulsion was added over a period of 60 min. at a uniform rate. The temperature of the resulting polymerization mixture was maintained at 88°–90° C. during the addition. The polymerization mixture was held at the above temperature for about 15 min. while Portion 4 was added. Portion 5 was emulsified as above and placed in an addition funnel and added over a 30 min. period while maintaining the temperature at 88°–90° C. The polymerization mixture was cooled to ambient temperature.

The resulting latex C polymer had the following composition:
Stage I: MMA/BA −20/80 weight ratio
Stage II: BA/TPM/HEA/MAA in a weight ratio of 75/8/10/7.
Overall MMA/BA/TPM/HEA/MAA 15/79/2.2/2.2/1.6

The polymer had a weight average molecular weight of about 250,000–1,250,000, a hydroxyl no. of 23, and an acid no. of 20. The latex had a polymer particle size of 0.092 microns, a gallon weight of 8.55 lbs/gal, pH of 2.7, percent weight solids of 34.1 and a percent volume solids 32.3.

Latex D was prepared using the above procedure except the following monomers were used:
Stage I: MMA/Styrene/BA/TPM −35/16/46/3 weight percent ratio,
Stage II: MMA/Styrene/BA/TPM/HEA/MAA in a weight ratio of 27/12/36/8/10/7
Overall MMA/Styrene/BA/TPM/HEA/MAA 33/15/44/4.2/2.2/1.6 The polymer had a weight average molecular weight of about 250,000–1,250,000, a hydroxyl no. of 23, and an acid no. of 20. The latex had a polymer particle size of 0.089 microns, a gallon weight of 8.63 lbs/gal, pH of 2.9, percent weight solids of 34.0 and a percent volume solids 31.5.

A white basecoat was prepared by charging the following constituents in the order shown into a mixing vessel and thoroughly blending together the constituents:

|  | Parts by Weight |
|---|---|
| Titanium dioxide aqueous slurry (76% solids) | 170.4 |
| Deionized water | 21.4 |
| Butyl Cellosolve (ethylene glycol monobutyl ether) | 18.3 |
| Polyurethane dispersion (described in Ex.1) | 133.6 |
| Latex D (prepared above) | 250.9 |
| Ammonium hydroxide solution (28% aqueous solution) | 2.6 |
| Thickener (Acrylic copolymer emulsion described in Ex.1) | 2.8 |
| Total | 600.0 |

The resulting coating composition had a solids content of 78%, a pigment/binder ratio of 100:100.

The white basecoat was sprayed onto a cold rolled steel panel, a phosphatized steel panel, a fiber glass reinforced polyester panel, a reaction injection molded urethane panel and a partially crystalline polyamide panel. The panels were then spray coated with a clear coating composition described in Example 1 and cured at ambient temperatures for 30 days. The resulting basecoat has a dry film thickness of about 1.0 mils thick and the clear coat had a dry film thickness of about 1.8-2.0 mils.

The coating on the panels had the following properties:

Appearance - excellent
20° Gloss=93
Dry crosshatch and tape adhesion=10
Humidity resistance (96 hour at 38° C./100% rel. humidity):
Crosshatch adhesion=10
Blistering=10
Rating system—same as Example 1.

A silver basecoat was prepared by adding the following ingredients to a mixing vessel:

|  | Parts by Weight |
|---|---|
| Portion 1 | |
| Latex D (prepared above) | 206.0 |
| Polyurethane Dispersion (described in Example 1) | 59.4 |
| Deionized Water | 195.8 |
| Thickener (described above) | 53.3 |
| Portion 2 | |
| Aluminum paste (64% aluminum flake in aliphatic hydrocarbon solvent) | 22.1 |
| Inhibitor solution (described in Ex.1) | 9.5 |
| Butyl Cellosolve | 43.2 |
| Portion 3 | |
| Ammonium hydroxide solution (described above) | 0.5 |
| Thickener (described above) | 10.2 |
| Total | 600.0 |

Portion 1 was added to the mixing vessel in the order shown and mixed. Portion 2 was premixed and added to the mixing vessel and mixed and then Portion 3 was added and mixed.

The silver basecoat was sprayed onto a cold rolled steel panel, a phosphatized steel panel, a fiber glass reinforced polyester panel, a reaction injection molded urethane panel and a partially crystalline polyamide panel. The panels were then spray coated with a clear coating composition described in Example 1 and cured at ambient temperatures for 30 days. The resulting basecoat has a dry film thickness of about 1.0 mils thick and the clear coat had a dry film thickness of about 1.8-2.0 mils.

The coating on the panels had the following properties:

Appearance - excellent
20° Gloss=95
Dry crosshatch and tape adhesion=10
Humidity resistance (96 hour at 38° C./100% rel. humidity):
Crosshatch adhesion=10
Blistering=10
Rating system—same as Example 1.

A white basecoat composition and a silver basecoat composition were prepared using the same constituents as above except above prepared Latex D was substituted for Latex C. Primed cold rolled steel panels were coated as above with the basecoats and then coated with a clear coat and dried as above. The resulting coated panels had an excellent appearance and about the same properties of gloss, adhesion, humidity resistance and blistering resistance as the panels prepared above with compositions prepared with Latex C.

What is claimed is:

1. A waterbased coating composition comprising about 10-30% by weight of film forming binder dispersed in an aqueous carrier and has a pH of about 7-10; wherein the binder consist essentially of about a. 60-90% by weight, based on the weight of the binder, of an acrylic silane polymer consisting essentially of polymerized monomers of alkyl methacrylate, alkyl acrylate or mixtures thereof, 1-10% by weight based on the weight of the acrylic silane polymer, of silane containing alkyl acrylate or methacrylate, sufficient monoethylenically unsaturated acid to provide the polymer with an acid number of 2-100 and sufficient hydroxy alkyl acrylate or hydroxy alkyl methacrylate to provide the polymer with a hydroxyl number of about 5-100, a glass transition temperature of −40° to +25° C. and a weight average molecular weight of 500,000 to 3,000,000 and the acid groups of the polymer are reacted with ammonia or an amine;

b. 10-40% by weight, based on the weight of the binder, of the dispersed polyurethane selected from the group consisting of polyester urethane, polyether urethane or polyacrylourethane.

2. The coating composition of claim 1 containing pigment in a pigment to binder weight ratio of about 1:100-200:100.

3. The coating composition of claim 1 in which the acrylic silane polymer consists essentially of polymerized monomers of an alkyl methacrylate, an alkyl acrylate or mixtures thereof each having 1-12 carbon atoms in the alkyl group, 2-10% by weight of a hydroxy alkyl methacrylate or acrylate having 2-4 carbon atoms in the alkyl group, 0.1-10% by weight of a monoethylenically unsaturated carboxylic acid and 1-10% by weight of an silane containing acrylate or methacrylate.

4. The coating composition of claim 3 in which the silane containing acrylate or methacrylate has the following structural formula:

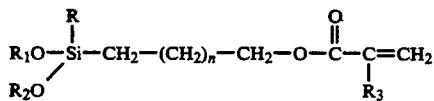

wherein:
R is selected from the group consisting of CH₃, CH₃CH₂, CH₃O, or CH₃CH₂O;
R₁ and R₂ are individually selected from the group consisting of CH₃ or CH₃CH₂; and
R₃ is selected from the group consisting of H, CH₃, or CH₃CH₂ and n is 0 or a positive integer of not greater than 8.

5. The coating composition of claim 4 in which the silane is selected from the group consisting of gamma trimethoxysilylpropyl methacrylate and gamma trimethoxysilylpropylacrylate.

6. The coating composition of claim 1 in which the acrylic silane polymer contains up to 20% by weight of polymerized styrene.

7. The coating composition of claim 1 which the acrylic silane polymer contains up to 10% by weight of polymerized methacrylamide or allyl methacrylate.

8. The coating composition of claim 1 in which the acrylic silane polymer consists essentially of about 40–50% by weight methyl methacrylate, 40–50% by weight of 2-ethylhexyl acrylate, 2–6% by weight gamma trimethoxysilyl propyl methacrylate, 2–5% by weight of hydroxyethyl acrylate and 1–3% by weight methacrylic acid.

9. The coating composition of claim 1 in which the acrylic silane polymer consists essentially of about 25–35% by weight methyl methacrylate, 10–20% by weight styrene, 40–50% by weight 2-ethylhexyl acrylate, 2–6% by weight gamma trimethoxysilylpropyl methacrylate 2–5% by weight hydroxyethyl acrylate and 1–3% by weight methacrylic acid.

10. The coating composition of claim 1 in which the acrylic silane is a graft copolymer formed by a two stage polymerization in which stage I monomers are polymerized and stage II monomers are added and polymerized and grafted to polymerized stage I monomers wherein stage I monomers consist essentially of about 10–30% by weight of methyl methacrylate and 70–90% by weight butyl acrylate and stage II monomers consist essentially of about 70–80% by weight of butyl acrylate, 6–10% by weight gamma trimethoxysilylpropyl methacrylate, 8–12% by weight hydroxyethyl acrylate and 5–9% by weight methacrylic acid.

11. The coating composition of claim 1 in which the acrylic silane is a graft copolymer formed by a two stage polymerization in which stage I monomers are polymerized and stage II monomers are added and polymerized and grafted to polymerized stage I monomers wherein stage I monomers consist essentially of about 30–40% by weight of methyl methacrylate, 10–20% by weight styrene, 40–50% by weight butyl acrylate and 1–5% by weight gamma trimethoxysilylpropyl methacrylate and stage II monomers consist essentially of about 25–30% by weight of methyl methacrylate, 10–15% by weight styrene, 30–40% by weight butyl acrylate, 6–10% by weight gamma trimethoxysilylpropyl methacrylate, 8–12% by weight hydroxyethyl acrylate and 5–9% by weight methacrylic acid.

12. The coating composition of claim 1 in which the acrylic silane is a graft copolymer formed by a three stage polymerization in which stage I monomers are polymerized, stage II monomers are added and polymerized and grafted to polymerized stage I monomers and stage III monomers are added and grafted onto polymerized stage I and stage II monomers wherein stages I and II monomers comprise methyl methacrylate, allyl methacrylate, butyl acrylate, and stage III monomers comprise methyl methacrylate, butyl acrylate and gamma trimethoxysilyl-propyl methacrylate.

13. The coating composition of claim 1 in which the polyurethane is a polyester urethane.

14. The coating composition of claim 13 in which the polyester urethane consists essentially of polyester polyol of a polyol and a dicarboxylic acid or an anhydride thereof, said polyester polyol is reacted with an organic diisocyanate which in turn is reacted with a hydroxy containing carboxylic acid, said acid being neutralized with a tertiary amine and the resulting product chain extended with a diamine.

15. The coating composition of claim 13 in which the polyester urethane consists essentially of a polyester polyol of a lactone reacted with a polyol, said polyester polyol is reacted with an organic diisocyanate which in turn is reacted with a hydroxy containing carboxylic acid, said acid being neutralized with a tertiary amine and the resulting product chain extended with a diamine.

16. The coating composition of claim 1 in which the polyurethane is a polyether urethane.

17. The coating composition of claim 16 in which the polyether urethane consists of a polyalkylene glycol having a weight average molecular weight of about 400–4500, said polyalkylene glycol is reacted with an organic diisocyanate which in turn is reacted with a hydroxy containing carboxylic acid, said acid being neutralized with a tertiary amine and the resulting product chain extended with a diamine.

18. The coating composition of claim 17 in which the polyalkylene glycol consists essentially of polypropylene glycol.

19. The coating composition of claim 1 in which the polyurethane is a polyacrylourethane.

20. The coating composition of claim 19 in which the polyacrylourethane consists essentially of a functional acrylic polymer of polymerized ethylenically unsaturated acrylic esters and ethylenically unsaturated monomers containing functional groups selected from the group consisting of carboxyl, hydroxyl, cyano, or glycidyl groups, said functional acrylic polymer is reacted with diisocyanate which in turn is reacted with a hydroxy containing carboxylic acid, said acid being neutralized with a tertiary amine and the resulting product chain extended with a diamine.

21. The coating composition of claim 1 in which the acrylic silane polymer consisting essentially of polymerized monomers of alkyl methacrylate, alkyl acrylate or mixtures thereof, 1–10% by weight, based on the weight of the acrylic silane polymer, of silane containing alkyl acrylate having the following structural formula

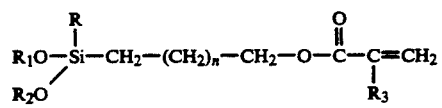

wherein:
R is selected from the group consisting of CH₃, CH₃CH₂, CH₃O, or CH₃CH₂; and
R₁ and R₂ are individually selected from the group consisting of CH₃ or CH₃CH₂; and
R₃ is selected from the group consisting of H, CH₃, or CH₃CH₂ and n is 0 or a positive integer of not greater than 8, and in which the polyurethane is a polyester urethane consisting essentially of a polyester polyol of a polyol and a dicarboxylic acid or an anhydride thereof said polyester polyol is reacted with an organic diisocyanate which in turn is reacted with a hydroxy containing carboxylic acid said acid being neutralized with a tertiary amine and the resulting product chain extended with a diamine.

* * * * *